(12) United States Patent
Sakers et al.

(10) Patent No.: US 7,665,373 B2
(45) Date of Patent: Feb. 23, 2010

(54) TORQUE MEASURING DEVICE WITH REDUNDANT TORQUE TRANSMISSION PATHS AND FAIL-SAFE MECHANISM

(75) Inventors: Charles A. Sakers, Odenton, MD (US); William R. Meier, Catonsville, MD (US)

(73) Assignee: Kop-Flex Inc., Hanover, MD (US)

( * ) Notice: Subject to any disclaimer, the term of this patent is extended or adjusted under 35 U.S.C. 154(b) by 50 days.

(21) Appl. No.: 12/141,210

(22) Filed: Jun. 18, 2008

(65) Prior Publication Data
US 2009/0314103 A1 Dec. 24, 2009

(51) Int. Cl.
*G01L 1/22* (2006.01)

(52) U.S. Cl. .................................. 73/862.338

(58) Field of Classification Search ................. 73/862.325–862.339
See application file for complete search history.

(56) References Cited

U.S. PATENT DOCUMENTS

| | | | |
|---|---|---|---|
| 5,237,880 A * | 8/1993 | Dobler et al. .......... 73/862.325 |
| 5,450,761 A | 9/1995 | Zilberman et al. |
| 5,969,269 A | 10/1999 | Munyon et al. |
| 6,517,113 B1 * | 2/2003 | Nicot .......................... 280/771 |
| 6,701,792 B2 * | 3/2004 | Laidlaw .................. 73/862.329 |
| 6,857,500 B2 * | 2/2005 | Halstead et al. ............. 180/446 |
| 6,912,923 B2 * | 7/2005 | Froehlich et al. ........ 73/862.333 |
| 7,565,845 B2 * | 7/2009 | Razzacki et al. .......... 73/862.53 |

* cited by examiner

*Primary Examiner*—Max Noori
(74) *Attorney, Agent, or Firm*—Harness, Dickey & Pierce, P.L.C.

(57) ABSTRACT

A torque transferring and monitoring device includes a coupling having a hub portion, a first rim portion, a first set of spokes radially extending between the hub portion and the first rim portion, a second rim portion spaced apart from the first rim portion and a second set of spokes radially extending between the hub portion and the second rim portion. The second set of spokes are axially spaced apart from the first set of spokes. A plurality of pins are fixed to the first rim portion. Each pin has a portion positioned in an aperture formed in the second rim portion. The pin is clear of the second rim portion when the coupling is in an unloaded state. The pin engages the second rim portion to transfer load between the first and second rim portions when a torque exceeding a predetermined magnitude is transferred through the coupling.

20 Claims, 4 Drawing Sheets

TORQUE MEASURING DEVICE WITH REDUNDANT TORQUE TRANSMISSION PATHS AND FAIL-SAFE MECHANISM

BACKGROUND

The present disclosure relates to a torquemeter for monitoring torque transferred between rotating shafts. In particular, the torquemeter of the present disclosure provides a dual load path to assure that a desired quantity of torque may be transmitted through the torquemeter. Kop-Flex has successfully sold torquemeters constructed in accordance with U.S. Pat. No. 5,969,269 entitled Flexible Coupling with Torque Measuring and Detecting Device, which is herein incorporated by reference. Another commonly owned torquemeter is patented under U.S. Pat. No. 5,450,761 which is also herein incorporated by reference. The existing Kop-Flex torquemeters were typically used in torque transfer applications that had a low threat of high transient torques. More recently, torquemeters are being installed and/or requested for use in a wider variety of applications. Many of the new applications subject the torquemeter to relatively large transient torques.

The new application criterion creates a design challenge. To provide a torquemeter with a desired accuracy at a nominal torque level, the torquemeter must exhibit a measurable amount of torsional twist. As such, the torquemeter must be relatively torsionally soft. A contradicting requirement arises with the need to transmit large transient torques. If a large transient torque were transmitted through a torquemeter designed for a much lower nominal torque, the components may become overstressed and may no longer transmit torque. On the other hand, if the torquemeter is designed to transmit the full maximum transient torque, a measurable amount of torsional twist will not occur and the torque measurement will be at best inaccurate.

Furthermore, new applications require that some member other than the torquemeter be the weakest link in the torque transfer driveline. For example, some turbo-machinery customers require that a flexible element be the weakest link in the driveline. Failing flexible element components may be more easily contained in the unlikely event of a catastrophic failure. As such, the torquemeter must be rated to transfer a quantity of torque at least greater than that of the weakest link in the driveline. Furthermore, recently designed turbo-machinery operates at higher power and increased rotational speeds as compared to earlier designs. As such, torquemeters that are limited to operation on applications less than 8000 rpm may not meet the needs of the customers.

Accordingly, to address the changes in turbo-machinery requirements and applications for torquemeters, it may be desirable to provide an improved torquemeter.

SUMMARY

A torque transferring and torque monitoring device includes a one-piece coupling having a hub portion, a first rim portion adapted to be fixed for rotation with a rotary driving member, a first set of spokes radially extending between the hub portion and the first rim portion, a second rim portion spaced apart from the first rim portion and adapted to be fixed for rotation with a rotary driven member, and a second set of spokes radially extending between the hub portion and the second rim portion. The second set of spokes are axially spaced apart from the first set of spokes. A plurality of pins are fixed to the first rim portion. Each pin has a portion positioned in an aperture formed in the second rim portion. The pin is clear of the second rim portion when the coupling is in an unloaded state. The pin engages the second rim portion to transfer load between the first and second rim portions when a torque exceeding a predetermined magnitude is transferred through the coupling.

In another arrangement, a torque transferring and torque monitoring device includes a one-piece coupling having a hub portion, a first rim portion adapted to be fixed for rotation with a rotary driving member, a first set of spokes radially extending between the hub portion and the first rim portion, a second rim portion spaced apart from the first rim portion and adapted to be fixed for rotation with a rotary driven member, and a second set of spokes radially extending between the hub portion and the second rim portion. The second set of spokes are axially spaced apart from the first set of spokes. A pin is fixed to the first rim portion. The pin has a portion positioned in an aperture formed in the second rim portion. The pin is clear of the second rim portion when the coupling is in an unloaded state. The pin engages the second rim portion to transfer load between the first and second rim portions when a torque exceeding a predetermined magnitude is transferred through the coupling. A first indicator is fixed to one of the first rim portion and the first set of spokes. A second indicator is fixed to one of the second rim portion and the second set of spokes. A sensor for detecting relative movement between the first and second indicators is provided.

A method of transferring and monitoring torque is also disclosed. The method provides a one-piece coupling including a hub portion, a first rim portion, a first set of spokes radially extending between the hub portion and the first rim portion, a second rim portion spaced apart from the first rim portion and a second set of spokes radially extending between the hub portion and the second rim portion. The second set of spokes are axially spaced apart from the first set of spokes. The method includes fixing a pin to the first rim portion and positioning a portion of the pin in an oversized aperture formed in the second rim portion wherein the pin is clear of the second rim portion when the coupling is in an unloaded state. Torque is transferred through the one-piece coupling through a first load path including the first set of spokes, the hub portion and the second set of spokes. The pin is engaged with the second rim portion to transfer load between the first and second rim portions along a second load path when a torque exceeding a predetermined magnitude is transferred through the coupling.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
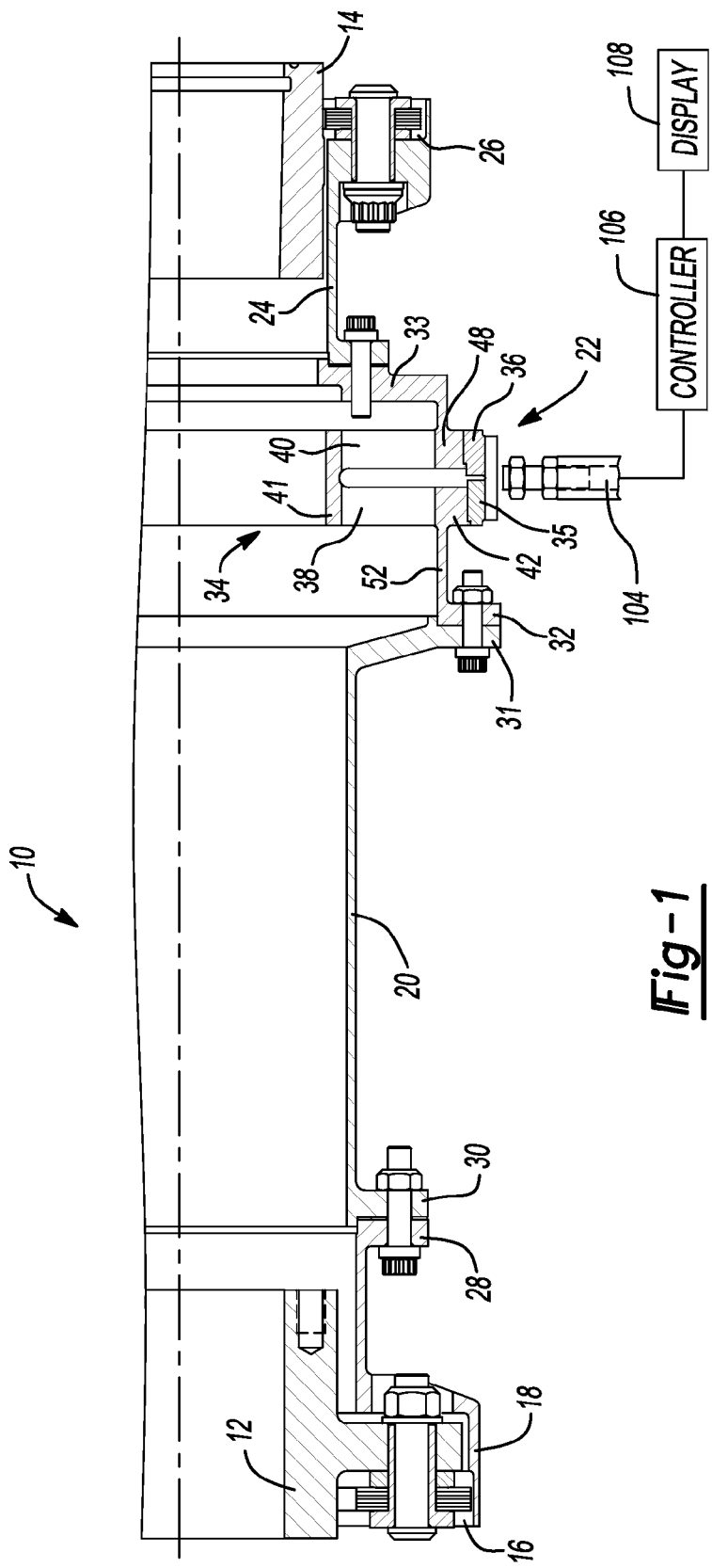
FIG. 1 is a schematic depicting an exemplary driveline equipped with a torquemeter constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1, a power transmitting driveline is illustrated at reference numeral 10. Driveline 10 includes a driving hub 12 coupled to an output shaft of a driving machine (not shown). Driveline 10 also includes a driven hub 14 coupled to an input shaft of a driven machine (not shown). Driveline 10 includes a first flexible coupling 16, a driving sleeve 18, a spacer 20, a torquemeter 22, a driven sleeve 24 and a second flexible coupling 26 drivingly connecting driving hub 12 to driven hub 14.

First flexible coupling 16 fixes driving hub 12 to driving sleeve 18 for rotation while allowing misalignment between driving hub 12 and driving sleeve 18. Driving sleeve 18 includes a flange 28 fixed for rotation with a first flange 30 of spacer 20. A second flange 31 of spacer 20 is fixed for rotation with a radially outwardly extending flange 32 of torquemeter 22. A radially inwardly extending flange 33 of torquemeter 22 is fixed to driven sleeve 24. It should be appreciated that torquemeter 22 may be configured to have other flange arrangements to facilitate connection to adjacent components other than the radially outwardly extending flange 32 and the radially inwardly extending flange 33. The position of the flanges of torquemeter 22 may be varied to mate with any number of flange sizes and shapes of the adjacent components coupled thereto. Second flexible coupling 26 transmits torque between driven sleeve 24 and driven hub 14 while allowing misalignment of driven hub 14 relative to driven sleeve 24.

Figure 2:
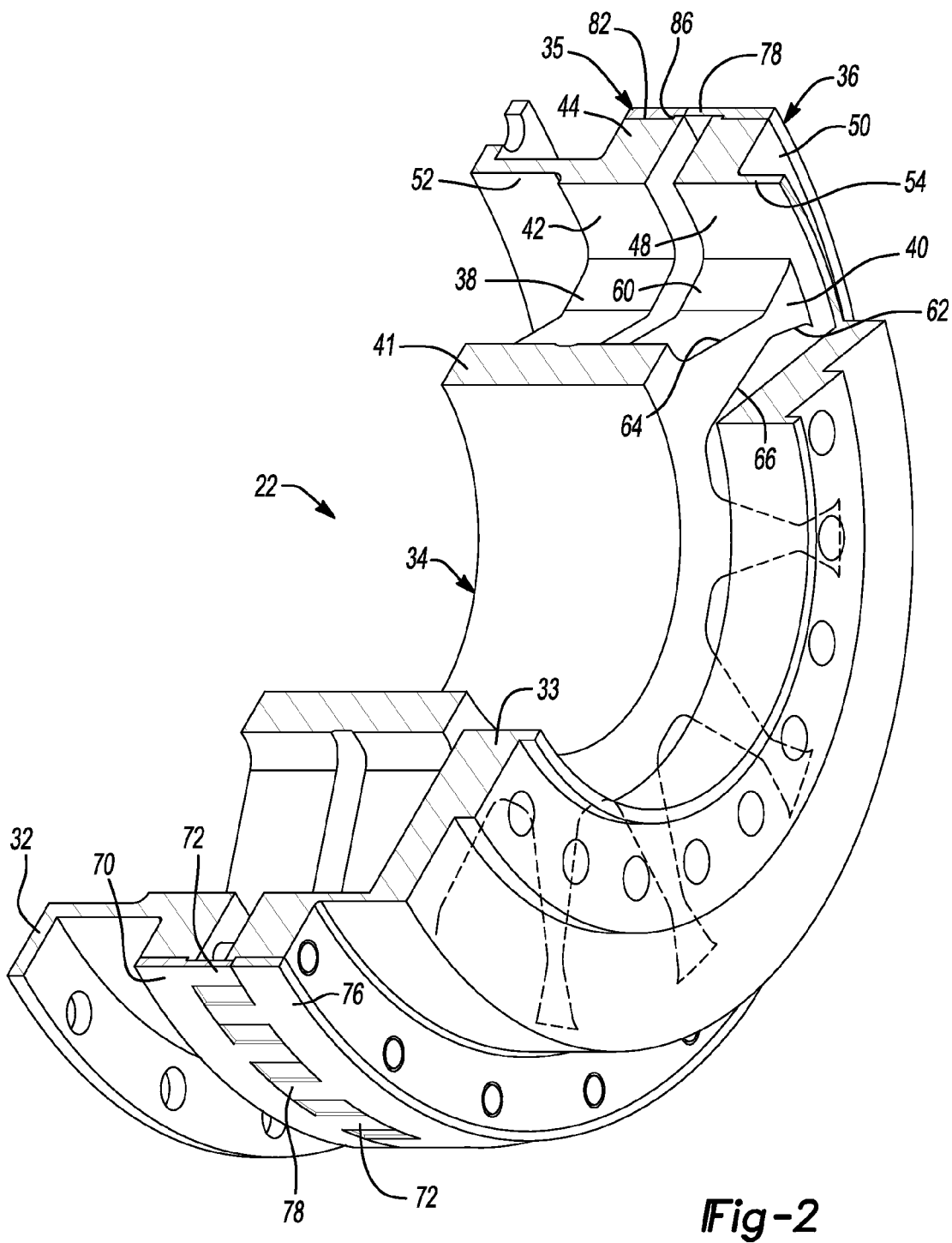
FIG. 2 is a fragmentary perspective view of the torquemeter.

With reference to FIG. 2, torquemeter 22 is generally shaped as a wheel and is configured to transfer torque between spacer 20 and driven sleeve 24. Torquemeter 22 includes a powerwheel 34, a first indicator 35 and a second indicator 36. Powerwheel 34 includes a first set of spokes 38 and an axially spaced apart second set of spokes 40. A central hub 41 is integrally formed with the radially inward ends of first set of spokes 38 and second set of spokes 40. A first rim 42 is integrally formed with the radially outward ends of first set of spokes 38. A first flange 44 radially extends from first rim 42 and is also integrally formed with the other portions of powerwheel 34.

A second rim 48 is integrally formed with the radially outward ends of second set of spokes 40. A second flange 50 radially extends from and is also integrally formed with second set of spokes 40. First flange 44 extends substantially parallel to and spaced apart from second flange 50.

A first tubular portion 52 axially extends from first rim 42 to interconnect radially outwardly extending flange 32 to first rim 42. Similarly, a second tubular portion 54 axially extends from second rim 48 to interconnect radially inwardly extending flange 33 with second rim 48. Powerwheel 34 is a one-piece component having each of the previously described portions integrally formed with one another. Powerwheel 34 may be formed from plastic or metal. For higher torque applications, it is contemplated that powerwheel 34 is formed from Titanium.

Each spoke of first set of spokes 38 and second set of spokes 40 includes a first pair of opposing tapered walls 60, 62 and a second pair of opposing tapered walls 64, 66. Each of the tapered walls converge at a location radially between central hub 41 and first and second rims 42, 48. This portion of each spoke defines a minimum cross-sectional area. The tapered spoke design facilitates relative torsional movement between first set of spokes 38 and second set of spokes 40 during torque transfer through driveline 10.

First indicator 35 includes a first band portion 70 and a plurality of axially extending and circumferentially spaced apart teeth 72. Teeth 72 are integrally formed with one another such that first indicator 35 is a one-piece component. First indicator 35 is constructed from a ferro-magnetic material.

Second indicator 36 is substantially identical to first indicator 35. Second indicator 36 includes a cylindrically-shaped band 76 and a plurality of axially extending and circumferentially spaced apart teeth 78 integrally formed with band 76. First indicator 35 and second indicator 36 may be heated to increase the size of bands 70, 76. While a temperature differential exists between powerwheel 34 and indicators 35, 36, the indicators are mounted on powerwheel 34. In particular, first indicator 35 is positioned such that teeth 72 axially extend over a portion of second flange 50. An inner cylindrical surface 80 of first indicator 35 is placed in engagement with an outer cylindrical surface 82 of first flange 44. A stop face 84 formed on band 70 engages a land 86 formed on first flange 44. Once first indicator 35 cools to the same temperature as powerwheel 34, band 70 will contract and maintain a shrink fit biased engagement with powerwheel 34.

Second indicator 36 is similarly coupled to second flange 50. Teeth 78 of second indicator 36 are positioned to axially extend over a portion of first flange 44. Teeth 78 are interleaved with teeth 72 such that teeth 72 and teeth 78 are circumferentially equally spaced apart from one another. Second indicator 36 is also a one-piece component constructed from a ferro-magnetic material.

Figure 3:
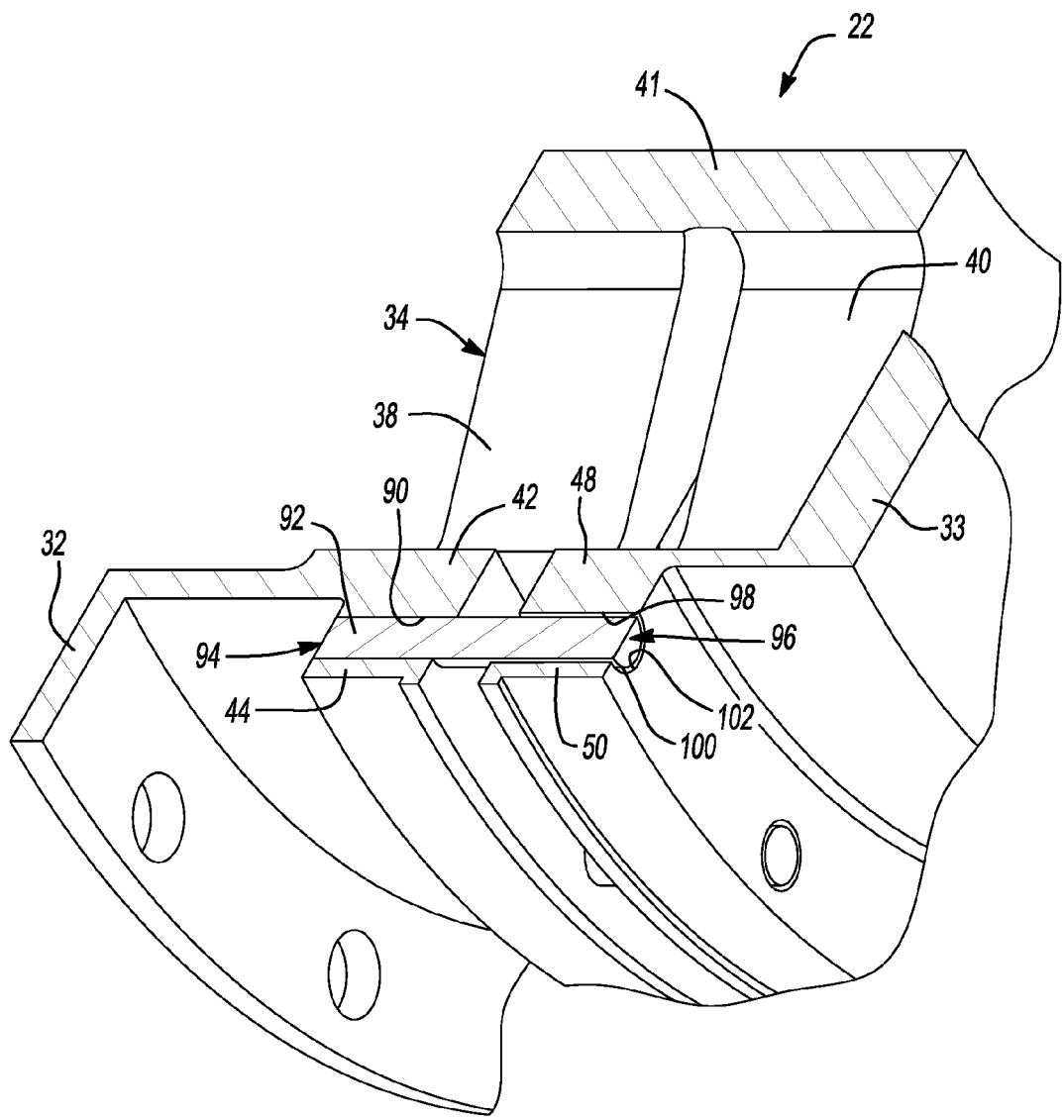
FIG. 3 is a fragmentary sectional perspective view of the torquemeter.

As best shown in FIG. 3, first flange 44 includes a plurality of circumferentially spaced apart first bores 90 extending therethrough. A plurality of pins 92 each have a first end 94 and a second end 96. Pins 92 have a substantially constant diameter. First ends 94 of pins 92 are positioned within first bores 90 and fixed to first flange 44. Any number of mechanical fixing means may be used including threaded engagement, welding, press-fitting, adhesive bonding or the like. Pins 92 need not be cylindrical, may be tapered or have some other shape.

A plurality of second bores 98 are circumferentially spaced apart from one another and configured to extend through second flange 50. Each second bore 98 is coaxially aligned with a respective one of bores 90. Second bores 98 have a larger inner diameter than first bores 90 such that a clearance exists between an outer surface 100 of each pin 92 and an inner cylindrical side wall 102 of each second bore 98. The magnitude of the clearance is calculated to correspond to a maximum torsional deflection between first rim 42 and second rim 48.

Based on this arrangement, torquemeter 22 has two modes of operation. During a first mode of operation, torque is transferred from radially outwardly extending flange 32 through first tubular portion 52, first rim 42, first set of spokes 38, central hub 41, second set of spokes 40, second rim 48, second tubular portion 54 and radially inwardly extending flange 33. Torque is transferred through torquemeter 22 along this singular flow path as long as the magnitude of torque transferred is below a predetermined magnitude. At this time, each of pins 92 are spaced apart from side walls 102 of second bores 98. Therefore, no load is transferred through pins 92 at this time.

In the first mode of operation, torquemeter 22 functions as a meter to provide an indication of the magnitude of torque transferred through powerwheel 34. As shown in FIG. 1, one or more sensors 104 are positioned along the circumference of torquemeter 22. Sensors 104 are operable to output signals indicative of the presence or absence of one of teeth 72, 78 in proximity to the position of sensor 104. In the torsionally unloaded condition, the circumferential spacing between teeth 72 and 78 defines a predetermined pattern. As the magnitude of torque transferred through powerwheel 34 increases, first rim 42 rotates relative to second rim 48. The spacing between teeth 72 and 78 will no longer be the same as when in the unloaded condition. A controller 106 evaluates the signal(s) output by sensor(s) 104 and determines the magnitude of torque transferred through powerwheel 34 based on the change in position of teeth 72 relative to teeth 78. A display 108 is in receipt of a signal from controller 106 and provides a visual output indicative of the torque transferred by torquemeter 22.

Depending on the application, torque magnitude variations may occur through driveline 10. In a typical, steady state, mode of operation, torque is transferred through powerwheel 34 at a level less than the predetermined magnitude torque previously described. Pins 92 do not engage second flange 50 at this time. If the magnitude of torque transferred through powerwheel 34 exceeds the predetermined maximum torque, each of pins 92 drivingly engage second flange 50. More particularly, each outer surface 100 of pins 92 drivingly engages the corresponding inner cylindrical side wall 102 of bores 98. At this time, load is transferred through torquemeter 22 along the first path previously described as well as multiple redundant paths including first flange 44, each pin 92 and second flange 50. In this manner, transient torque fluctuations may be accommodated without applying undue stress to first set of spokes 38, central hub 41 and second set of spokes 40. Once the torque magnitude transferred by torquemeter 22 reduces to a level less than the predetermined magnitude, pins 92 no longer engage second flange 50 and torquemeter 22 returns to the first mode of operation where load is transferred through powerwheel 34 along the single load path first described.

Figure 4:
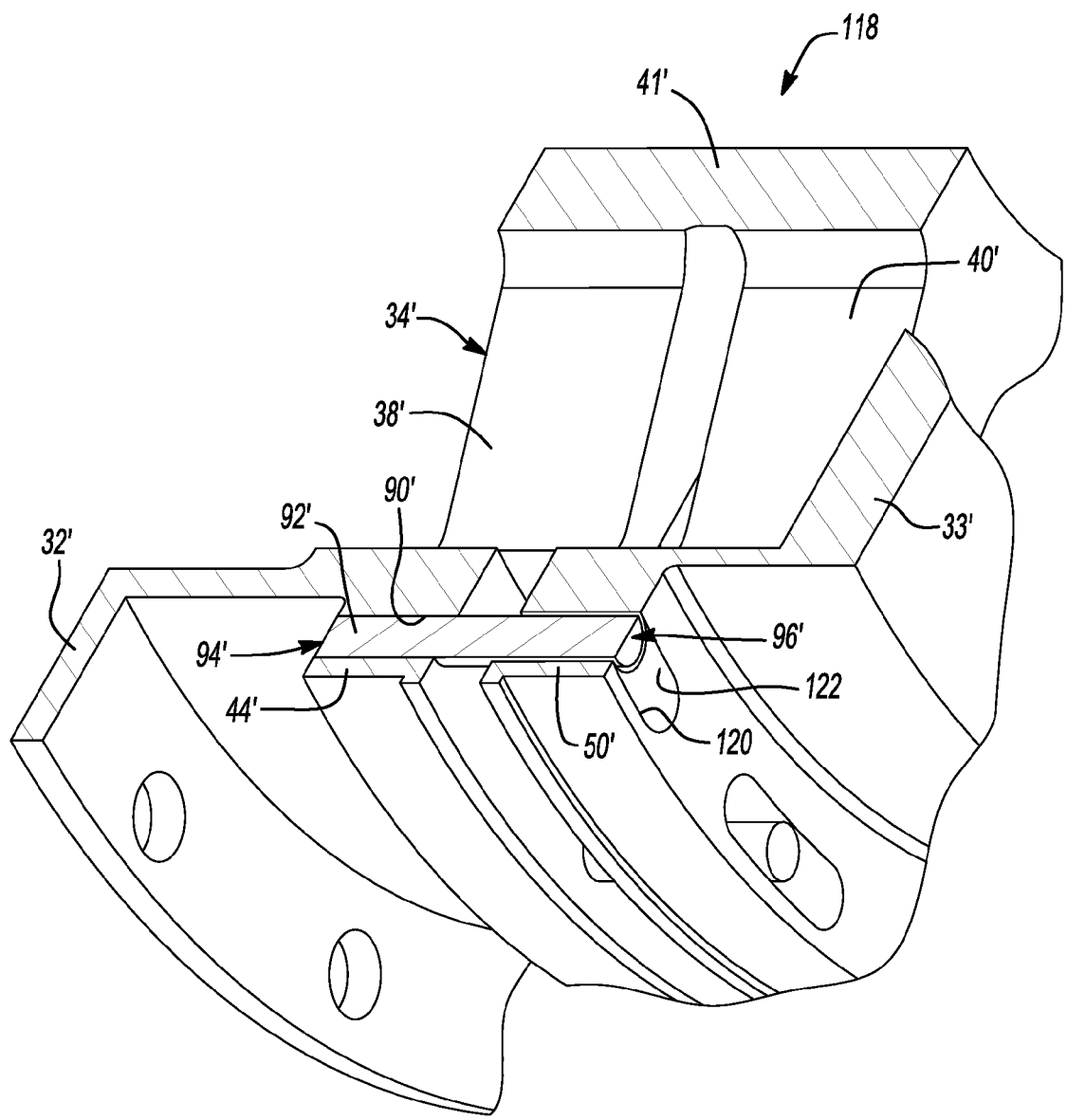
FIG. 4 is a fragmentary perspective view of an alternate torquemeter.

In another arrangement depicted in FIG. 4, a torquemeter 118 includes a powerwheel 34' having a second flange 50' including a plurality of circumferentially spaced apart slots 120 in lieu of cylindrically shaped bores 98. The remaining portions of torquemeter 118 are substantially similar to torquemeter 22. As such, like elements will retain their previously introduced reference numerals including a prime suffix. Slots 120 extend along an arc such that pins 92' may remain clear of a side wall 122 defining slot 120 while torquemeter 118 operates in a first mode similar to the first mode previously described in relation to torquemeter 22. Once the predetermined magnitude of torque has been exceeded, each outer surface 100' of pins 92' engages a side wall 122 of slot 120. At this time, multiple redundant load paths exist through pins 92' in addition to the first load path previously described. By providing elongated arced slots 120, a large angular relative rotation between first rim 42' and second rim 48' may be accommodated.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A torque transferring and torque monitoring device comprising:
   a one-piece coupling including:
      a hub portion;
      a first rim portion adapted to be fixed for rotation with a rotary driving member;
      a first set of spokes radially extending between the hub portion and the first rim portion;
      a second rim portion spaced apart from the first rim portion and adapted to be fixed for rotation with a rotary driven member;
      a second set of spokes radially extending between the hub portion and the second rim portion, the second set of spokes being axially spaced apart from the first set of spokes; and
   a plurality of pins fixed to the first rim portion, each pin of the plurality of pins having a portion positioned in an aperture formed in the second rim portion, the pin being clear of the second rim portion when the coupling is in an unloaded state, the pin engaging the second rim portion to transfer load between the first and second rim portions when a torque exceeding a predetermined magnitude is transferred through the coupling.

2. The device of claim 1 further including:
   a first indicator fixed to one of the first rim portion and the first set of spokes;
   a second indicator fixed to one of the second rim portion and the second set of spokes; and
   a sensor for detecting relative movement between the first and second indicators.

3. The device of claim 2 wherein each spoke of the first set of spokes has a reduced cross-sectional area positioned between the first rim portion and the hub portion.

4. The device of claim 3 wherein the coupling includes titanium.

5. The device of claim 4 wherein the first and second indicators include a ferromagnetic material.

6. The device of claim 1 wherein the plurality of pins are circumferentially spaced apart.

7. The device of claim 1 wherein the apertures of the second rim portion in receipt of the pins are arcuately shaped to allow the first rim portion to rotate relative to the second rim portion prior to transferring load through the plurality of pins.

8. The device of claim 2 wherein the first indicator includes a first ring having a plurality of axially extending and circumferentially spaced apart teeth.

9. The device of claim 8 wherein the second indicator includes a second ring having a plurality of axially extending and circumferentially spaced apart teeth.

10. The device of claim 9 wherein the teeth of the first ring are interleaved with the teeth of the second ring.

11. The device of claim 1 wherein the hub and the pins simultaneously transfer load between the first rim portion and the second rim portion when the torque transferred by the coupling exceeds the predetermined magnitude.

12. A torque transferring and torque monitoring device comprising:
   a one-piece coupling including:
      a hub portion;
      a first rim portion adapted to be fixed for rotation with a rotary driving member;
      a first set of spokes radially extending between the hub portion and the first rim portion;

a second rim portion spaced apart from the first rim portion and adapted to be fixed for rotation with a rotary driven member;

a second set of spokes radially extending between the hub portion and the second rim portion, the second set of spokes being axially spaced apart from the first set of spokes; and a pin fixed to the first rim portion, the pin having a portion positioned in an aperture formed in the second rim portion, the pin being clear of the second rim portion when the coupling is in an unloaded state, the pin engaging the second rim portion to transfer load between the first and second rim portions when a torque exceeding a predetermined magnitude is transferred through the coupling;

a first indicator fixed to one of the first rim portion and the first set of spokes;

a second indicator fixed to one of the second rim portion and the second set of spokes; and a sensor for detecting relative movement between the first and second indicators.

13. The device of claim 12 wherein the first indicator includes an axially extending first tooth overlapping a portion of the second rim portion.

14. The device of claim 13 wherein the second indicator includes an axially extending second tooth overlapping a portion of the first rim portion.

15. The device of claim 12 wherein the first indicator includes a first ring having a plurality of axially extending and circumferentially spaced apart teeth.

16. The device of claim 15 wherein the second indicator includes a second ring having a plurality of axially extending and circumferentially spaced apart teeth.

17. The device of claim 16 wherein the teeth of the first ring are interleaved with the teeth of the second ring.

18. The device of claim 12 wherein the hub and the pin simultaneously transfer load between the first rim portion and the second rim portion when the torque transferred by the coupling exceeds the predetermined magnitude.

19. A method of transferring and monitoring torque, comprising:

providing a one-piece coupling including a hub portion, a first rim portion, a first set of spokes radially extending between the hub portion and the first rim portion, a second rim portion spaced apart from the first rim portion and a second set of spokes radially extending between the hub portion and the second rim portion, the second set of spokes being axially spaced apart from the first set of spokes;

fixing a pin to the first rim portion;

positioning a portion of the pin in an oversized aperture formed in the second rim portion wherein the pin is clear of the second rim portion when the coupling is in an unloaded state;

transferring torque through the one-piece coupling through a first load path including the first set of spokes, the hub portion and the second set of spokes; and engaging the pin with the second rim portion to transfer load between the first and second rim portions along a second load path when a torque exceeding a predetermined magnitude is transferred through the coupling.

20. The method of claim 19 further including detecting relative movement between a first indicator fixed to one of the first rim portion and the first set of spokes and a second indicator fixed to one of the second rim portion and the second set of spokes.

* * * * *